March 18, 1930.  J. McMULLEN  1,751,013
COTTER PIN SPREADER
Filed Aug. 2, 1928
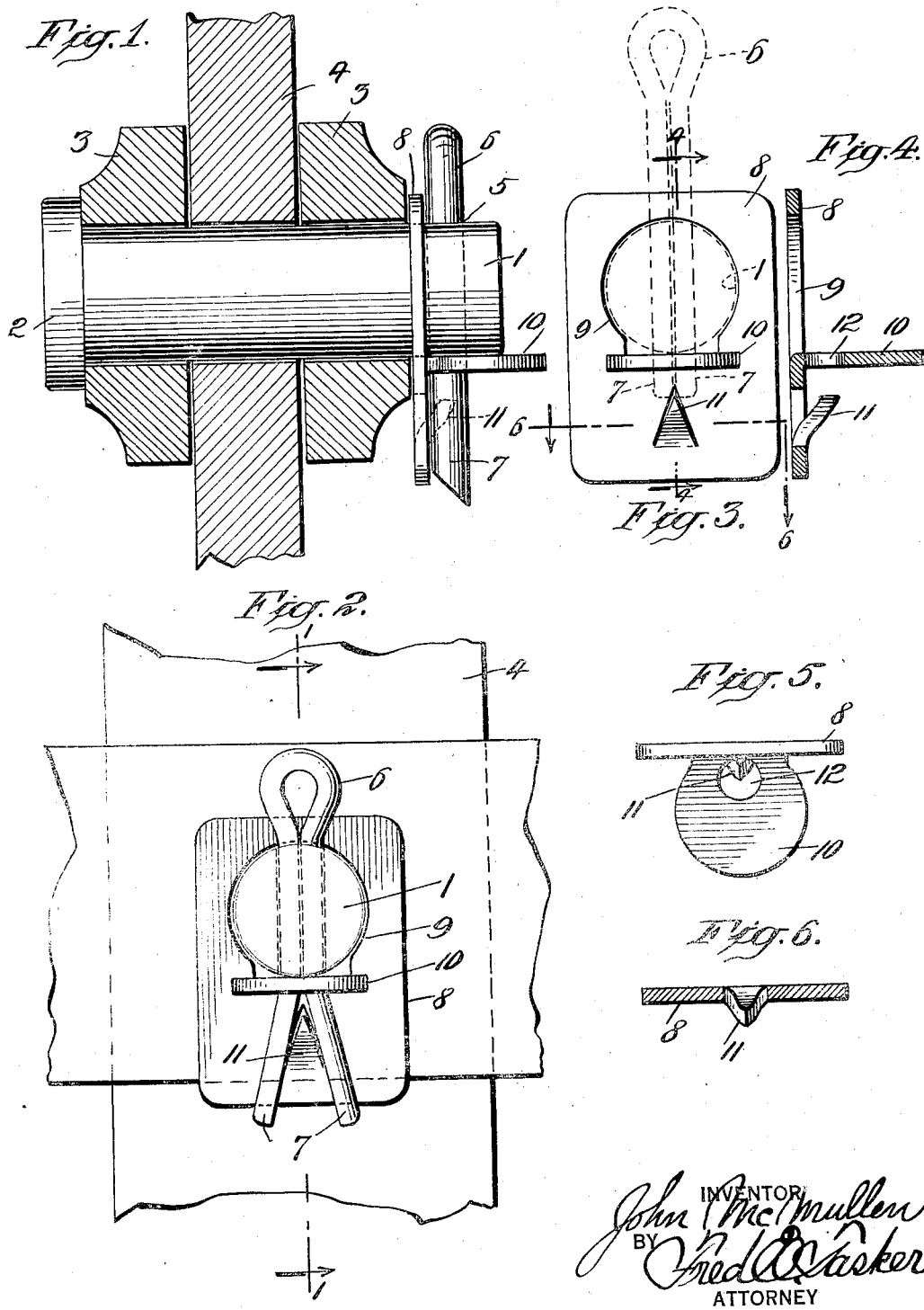

Patented Mar. 18, 1930

1,751,013

UNITED STATES PATENT OFFICE

JOHN McMULLEN, OF BUFFALO, NEW YORK

COTTER-PIN SPREADER

Application filed August 2, 1928. Serial No. 296,927.

My present invention refers to and involves certain novel and useful means for spreading the prongs or legs of a cotter pin when the pin is being driven into its operative position, so that said legs may automatically assume the diverging position in which they lock the pin against loosening or withdrawal through the pin hole.

The invention has as one of its chiefest objects the positioning of the cotter pin quickly and the simultaneously locking of the same by causing its legs to spread at the same time that it is driven through the opening that receives it.

The invention though adapted for use with all kinds of bent or bifurcated pins, is primarily useful with large and heavy cotter pins that are employed in the brake mechanism of railway rolling stock or other large machines, where the opening or spreading of the legs of the pin is important but is sometimes neglected or overlooked, since a tool has been required to overcome the stiffness of the pin, but my invention renders such tool unnecessary.

And my improvements consist essentially in the use of a washer which is perforated to be slipped over the end of the bolt through an opening in which the cotter pin is then passed alongside of the washer. And said washer is provided with a struck-out or projecting pointed or wedging lug that is inclined in position.

The pointed end of the lug is so centered with relation to the pin hole that when the pin is driven through the hole the sharp point on the wedging lug will enter between the closed prongs of the cotter so as to separate them and bend them divergently into the open position which locks the pin firmly and non-withdrawably.

And the invention further includes numerous details and peculiarities in the construction, arrangement, and combination of parts, substantially as will be hereinafter described and claimed.

In the annexed drawing illustrating my invention:

Figure 1 is an edge view of my improved cotter pin in its operative position in one of the various bolts belonging to car brake mechanism, certain parts of the latter being indicated in section on the line 1, 1, of Figure 2 simply to show a support for the bolt.

Figure 2 is a front view of the same.

Figure 3 is a detail front view of the washer formed with the spreader lug.

Figure 4 is a vertical section of the same on the line 4, 4, of Figure 3.

Figure 5 is a top plan view of the washer.

Figure 6 is a horizontal section on the line 6, 6, of Figure 4.

Like characters of reference denote like parts in all the figures of the drawing.

1 designates a bolt or pin, having a head 2. This is selected for portrayal simply as an example of bolt with which a cotter pin may be used. I have also shown a pair of brake rods 3, 3, held to the vertical truck member 4 by means of the bolt 1, these parts being shown merely as fragments taken from some portion of a brake mechanism. Of course my cotter pin is adapted for use with any kind of bolt with any kind of machine, though more particularly useful with the heavy wire cotter pins in car truck braking apparatus.

The bolt 1 has a transverse hole 5 through which the cotter pin is passed and then opened to anchor the bolt 1 in place and thus hold parts 3 and 4, or any other, together. Washers may or may not be used with the bolt and cotter pin.

The particular cotter pin shown is of a strong heavy type, being made of thick wire, (half round or otherwise) bent at 6 to make a head and having the closely-placed parallel members 7, 7, which are in close proximity to each other as shown in dotted lines in Figure 4. This type of pin when inserted in hole 5 will have its inserted prongs or members 7, 7, spread divergently, so that the pin cannot be withdrawn, for it is held by the spread prongs 7 from moving in one direction and by the bulged head 6 from going in the other direction.

My novel device which automatically spreads the cotter legs 7, 7, after they pass through the hole 5, and does away with the necessity of using a wrench or tool for separating these strong, tight prongs, besides facilitating the quick driving of the cotters, adds greatly to the effective use of the cotter pins. In order to accomplish this therefore I provide a washer 8, which may be a flat, thin, metal plate of any size, having therein a round hole 9 which enables the washer 8 to be slipped easily over the end of the bolt 1 against the brake member 3 before the cotter pin is driven through its receiving hole 5.

This washer 8 moreover has an integral lug or plate 10 bent out therefrom when the round hole 9 is made, and preferably projecting in a horizontal plane or a plane at right angles to the washer 8. This lug or plate 10 is perforated at 12 with a hole which is directly in line with the cotter pin hole 5 in the bolt, and serves as a guide for the cotter pin after it passes through the hole 5, so that said guide hole 12 may then receive the cotter pin, as shown by Figure 5, and guide it directly and surely to the pointed triangular spreader lug 11 that lies centrally beneath perforation 12.

This angular sharp lug 11 is preferably formed by striking or stamping it up from the material of washer 8, to cause it to take the shape of a wedge and to take the position shown in Figure 4, on an incline as in Figures 4 and 6, centrally below hole 12 as in Figure 5, where it will be struck by the two prongs 7, 7, as they contact with it below hole 12, as seen in Figure 2, the point of lug 11 entering between prongs 7, 7, and separating them and causing them to diverge more or less, as they are acted on by the triangular or wedge shape of the projection 11. Obviously the member 11 may be of any shape calculated to do its work, and may be formed in any manner.

Many changes in the construction, combination, and details of the parts, may be made without exceeding the scope of the claim.

What I claim, is:

A device of the character described comprising a plate having a bolt or pin receiving opening therein, a wedge shaped cotter pin spreading projection carried by said plate, and a tongue carried by said plate and provided with an aperture through which the cotter pin is adapted to be passed prior to its engagement with said projection, said tongue being disposed between said projection and the bolt or pin receiving opening in said plate and being formed by bending the metal of the plate originally closing said bolt or pin receiving opening at, or substantially at, right angles to the plate.

In testimony whereof I hereunto affix my signature.

JOHN McMULLEN.